(12) United States Patent
Murphy (10) Patent No.: US 9,398,342 B1
(45) Date of Patent: Jul. 19, 2016

(54) INTERACTIVE APPLICATIONS

(71) Applicant: Amazon Technologies, Inc., Reno, NV (US)

(72) Inventor: Ryan David Murphy, Ashburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 653 days.

(21) Appl. No.: 13/689,022

(22) Filed: Nov. 29, 2012

(51) Int. Cl.
*H04N 21/482* (2011.01)
*H04N 21/81* (2011.01)
*H04N 21/431* (2011.01)

(52) U.S. Cl.
CPC ......... *H04N 21/482* (2013.01); *H04N 21/4316* (2013.01); *H04N 21/8126* (2013.01)

(58) Field of Classification Search
None
See application file for complete search history.

(56) References Cited

U.S. PATENT DOCUMENTS

| | | | | |
|---|---|---|---|---|
| 5,737,028 | A * | 4/1998 | Bertram et al. | 725/37 |
| 6,567,984 | B1 * | 5/2003 | Allport | 725/110 |
| 7,360,232 | B2 * | 4/2008 | Mitchell | 725/112 |
| 7,539,472 | B2 * | 5/2009 | Sloo | 455/151.1 |
| 8,294,831 | B2 * | 10/2012 | Pal | 348/734 |
| 8,413,207 | B2 * | 4/2013 | Fukuda | 725/141 |
| 8,464,297 | B2 * | 6/2013 | Yao | 725/87 |
| 8,528,012 | B2 * | 9/2013 | Zeleznikar | 725/13 |
| 2003/0035075 | A1 * | 2/2003 | Butler et al. | 348/734 |
| 2005/0108751 | A1 * | 5/2005 | Dacosta | 725/39 |
| 2006/0004834 | A1 * | 1/2006 | Pyhalammi et al. | 707/102 |
| 2006/0101338 | A1 * | 5/2006 | Kates | 715/716 |
| 2006/0123451 | A1 * | 6/2006 | Preisman | 725/86 |
| 2006/0271995 | A1 * | 11/2006 | Hagawa et al. | 725/135 |
| 2011/0138416 | A1 * | 6/2011 | Kang et al. | 725/39 |
| 2011/0298596 | A1 * | 12/2011 | Warrick | 340/12.53 |
| 2013/0347022 | A1 * | 12/2013 | Bates et al. | 725/25 |

* cited by examiner

*Primary Examiner* — Mark D Featherstone
(74) *Attorney, Agent, or Firm* — Thomas | Horstemeyer, LLP (57) ABSTRACT

Disclosed are various embodiments to facilitate interactive experiences. Interactive content includes video content that is streamed to a client device, such as a set-top box. Complementary content is transmitted to a controller device, such as a tablet computing system and/or smartphone. Input obtained from the controller device can affect an update to the video content and/or complementary content.

26 Claims, 7 Drawing Sheets

INTERACTIVE APPLICATIONS

BACKGROUND

Interactive content is often consumed via personal computing devices, such as tablet devices, personal computers, and/or smartphones. Non-interactive streaming video content is often consumed via televisions, set-top boxes, and/or personal computing devices. Interactive games are often consumed via personal computing devices and/or gaming consoles where user feedback and/or inputs are obtained via the computing device and/or gaming console on which the content is consumed.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Embodiments of the present disclosure are directed to facilitating interactive applications that are, at least in part, remotely executed over a network. Applications, such as games, educational applications, and/or other interactive content, can employ multiple client devices that are in communication via a network with a computing environment, in which interactive content is executed. To this end, video, audio, and/or other data generated by the interactive application may be sent over the network to a remotely located client device. Input commands for the interactive application may be obtained over the network from the remotely located client devices and provided to the interactive application.

In one scenario, one client device can be configured to render video content on a display device, such as a television, while another client device can be configured as a controller and/or second screen device to provide complementary content in tandem with the video content shown on the display device. For example, a controller can comprise a tablet device that is equipped with a touchscreen input device and/or other form of input device.

Figure 1:
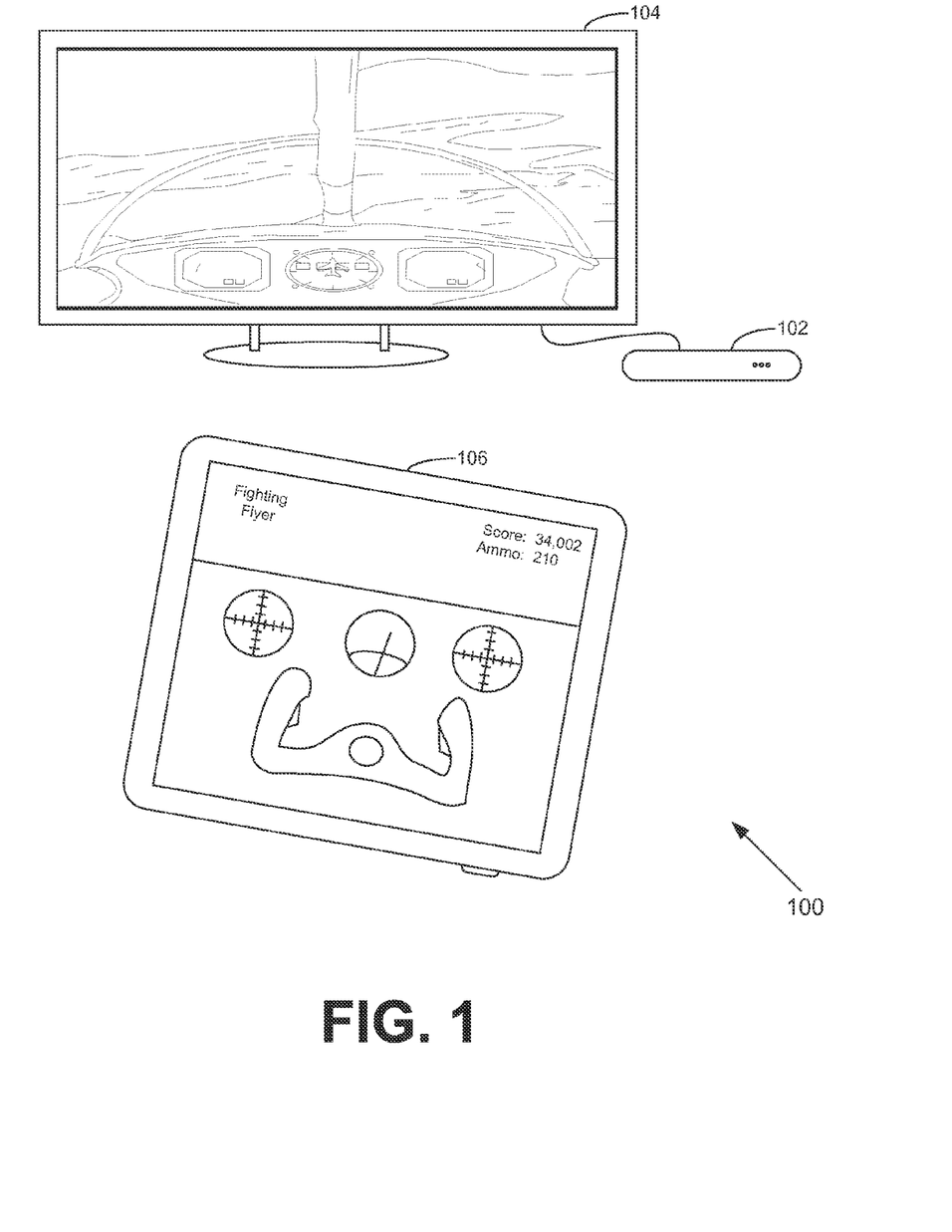
FIG. 1 is a drawing of one example of a client device and controller facilitating an interactive experience according to various embodiments of the disclosure.

As one example, illustrated in FIG. 1, shown is an environment illustrating an interactive experience facilitated by embodiments of the present disclosure. FIG. 1 depicts an environment 100 in which a client device 102 is coupled to a display device 104. The client device 102 is in communication via a network with a computing environment from which interactive content is retrieved and which the client device 102 renders on the display device 104. In the depicted example, the client device 102 facilitates rendering of video content on the display device 104. In one embodiment, a client device 102 can comprise a set-top box, a personal computer, or any other device that can communicate via a network as well as render video on a display device 104.

The environment 100 also illustrates a controller device 207 that is independently in communication via a network with a computing environment from which interactive content is retrieved. In the depicted example, the controller device 207 can render complementary content that is associated with the interactive content, which in the case of FIG. 1 is a high-twitch-action video game where content associated with the game is rendered on both devices and user inputs can be obtained from the controller device 207. As will be described herein, interactive content can take many forms and may also involve a multi-user experience where multiple users are providing inputs to the computing environment via a controller device 207 as well as viewing complementary content on multiple controller devices 207 that may or may not be disparately located.

Figure 2:
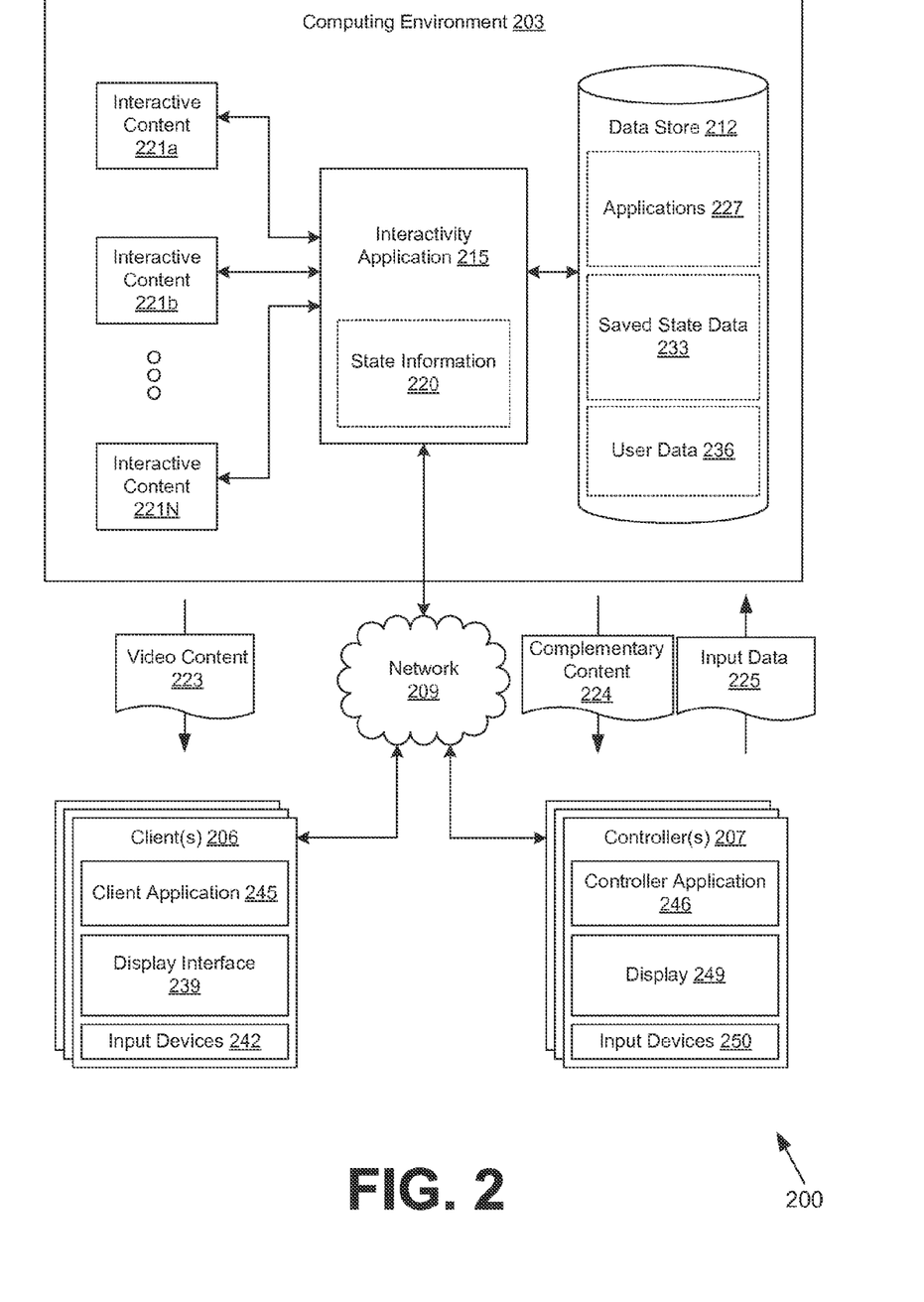
FIG. 2 is a drawing of a networked environment facilitating an interactive experience by an interactivity application according to various embodiments of the disclosure.

With reference to FIG. 2, shown is a networked environment 200 according to various embodiments. The networked environment 200 includes a computing environment 203 and at least one client device 206, which are in data communication with each other via a network 209. The network 209 may include, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that are arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an interactivity application 215, a plurality of interactive content 221a . . . 221N, and other applications, services, processes, systems, engines, or functionality not discussed in detail herein. The interactivity application 215 may correspond to a type of application session server. The interactivity application 215 is executed to launch interactive content 221 sessions in response to requests from users. In this sense, the interactivity application 215 establishes an interactive content 221 session corresponding to an interactive application 227 that is requested by a user via a controller 207 and/or client 206. The interactivity application 215 is also executed to capture input data 225 from the clients 206 and/or controllers 207 and provide the input data 225 to the interactive content 221 session.

The interactivity application 215 is also executed to send video content 223 and/or complementary content 224 that is captured from the interactive content 221 to the clients 206 and/or controllers 207. The interactivity application 215 may communicate with a client 206 and/or controller 207 over various protocols such as, for example, hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 209. The interactivity application 215 may be configured to maintain state information 220 associated with the executing interactive content 221.

In various embodiments, the interactivity application 215 may be configured to transmit video content as well as complementary content associated with particular interactive content. For example, video content can be streamed to a client 206, which can be rendered by the client 206 on a display device in communication with the client 206. Additionally, complementary content, which can include video and other types of content, can be streamed to the controller 207 and rendered by the controller 207 on a display. A given interactive content 221 session can also incorporate multiple controllers 207 that are in communication with the interactivity application 215 via the network 209. In this sense, the interactivity application 215 can support a multi-user interactive experience in which multiple users can participate in an interactive experience via multiple controllers 207 that render complementary content.

The interactive application 227 may correspond, for example, to a game, an interactive story, educational content, or other types of applications. As non-limiting examples, the interactive application 227 may correspond to a high twitch-action game, a first-person shooter game, an action game, an adventure game, a party game, trivia game, educational games, a role-playing game, a simulation game, a strategy game, a vehicle simulation game, and/or other types of games. The interactive applications 227 may also correspond to mobile phone applications, computer-aided design (CAD) applications, computer-aided manufacturing (CAM) applications, photo manipulation applications, video editing applications, office productivity applications, operating systems and associated applications, emulators for operating systems, architectures, and capabilities not present on a consumer device, and other applications and combinations of applications. The interactive applications 227 may further correspond to interactive movies, stories, and/or other forms of content in which progression of a storyline or progress through an interactive world depends upon user input and/or selections via a controller 207.

The state information 220 that is maintained by the interactivity application 215 includes various data relating to application sessions that are currently active. For example, the state information 220 may track the users that are currently participating in an application session, status information associated with the users, security permissions associated with the application session (e.g., who can or cannot join), and so on. In some embodiments, some or all of the state information 220 may be discarded when an application session ends. The data stored in the data store 212 includes, for example, interactive applications 227, saved state data 233, user data 236, and potentially other data. The interactive applications 227 correspond to a library of different applications that provide interactive content 221 and that are available to be launched as interactive applications 227. The interactive applications 227 may correspond to executable code within the computing environment 203.

The saved state data 233 corresponds to session states that have been saved by the interactivity application 215 and that correspond to an interactive content 221 session. Because the interactive applications 227 may be executed in a virtualized environment, the interactivity application 215 may write state information to a virtual location, which is then mapped for storage in the data store 212 as the saved state data 233. The saved state data 233 may correspond to data saved normally by the interactive application 227 or may correspond to a memory image of the interactive application 227 that may be resumed at any time. The user data 236 includes various data related to the users of the interactive applications 227, such as, for example, types of computing devices associated with a user, security credentials, application preferences, billing information, a listing of other users that are permitted to join application sessions started by the user, and so on. The user data 236 may also identify media streaming devices, set-top boxes, tablet devices, smartphones, or other devices that are associated with a user's account. To this end, the user data 236 may include one or more hardware or software identifiers that identify a device. In one embodiment, a user may install a client application on a device and register the device with the interactivity application 215 by providing user authentication credentials, which can cause the device to be associated with the user's account.

The client 206 and/or controller 207 are representative of one or more devices that may be coupled to the network 209 and that can be independently in communication with the computing environment 203. The clients 206 and/or controllers 207 may be geographically diverse. The clients 206 and/or controllers 207 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 206 may include a display interface 239 that is coupled to a display device. A display device may comprise, for example, one or more devices such as cathode ray tubes (CRTs), liquid crystal display (LCD) screens, gas plasma-based flat panel displays, LCD projectors, or other types of display devices, etc. The client 206 may therefore render video content provided by the interactivity application 215 on a display device via the display interface 239. In some cases, such a display device may be a display that is integrated within the client 206. For example, a client 206 may comprise a tablet device, a laptop computer, a television, or any other type of device having an integrated display.

In some embodiments, the client 206 and/or controller 207 may include one or more input devices 242 and/or input devices 250, respectively. The input devices 242 and/or input devices 250 may comprise, for example, devices such as touchscreen input devices, keyboards, mice, joysticks, accelerometers, light guns, game controllers, touch pads, touch sticks, push buttons, optical sensors, microphones, webcams, and/or any other devices that can provide user input. Additionally, various input devices 242 and/or input devices 250 may incorporate haptic technologies in order to provide feedback to the user.

The client 206 may be configured to execute various applications such as a client application 245 and/or other applications. The client application 245 is executed to allow a user to launch, join, play, or otherwise interact with interactive content 221 executed by the computing environment 203. Additionally, the client application 245 facilitates rendering of video content that is streamed via the network 209 by the interactivity application 215 and that is associated with interactive content 221. The client application 245 is also configured to obtain video content 223 over the network 209 from the computing environment 203 and render a screen on the display 249. To this end, the client application 245 may include one or more video and audio players to play out a media stream generated by an interactive application 227. In one embodiment, the client application 245 comprises a plug-in or other client-side code executed within a browser application.

The client 206 may be configured to execute applications beyond the client application 245 such as, for example, browser applications, email applications, instant message applications, and/or other applications. In some embodiments, multiple clients 206 may be employed for one or more users to interact with the interactive application 227.

The controller 207 may be configured to execute a controller application 246 and/or other applications. The controller application 246 is executed to allow a user to view complementary content that is related to interactive content 221 requested by the user and/or video content that is rendered on a display device by the client application 245. For example, the complementary content may comprise text, video and/or imagery that is related to the video content rendered by the client application 245. Additionally, the controller application 246 can also capture user inputs from a user and transmit the user inputs via the network 209 to the interactivity application 215, which can update the video content provided to the client 206 and/or the complementary content provided to the controller 207 in response.

Accordingly, as briefly described above, the interactivity application 215 can facilitate interactive experiences that involve client device 206 that renders video content 223 provided by the interactivity application 215 via the network 209 as well as a controller device 207 that is independently in communication with the interactivity application 215 via the network 209. In many embodiments, the controller 207 can comprise a tablet device, a smartphone, or any other device with an integrated display 249. As noted above, the controller 207 can also comprise one or more input device 242 that can be captured by a controller application 246 executed by the controller 207 and transmitted via the network 209 to the interactivity application 215.

The depicted framework can facilitate various types of interactive experiences that can be provided to a user. For example, an interactive application 227 can be requested by a user via a controller 207 to be consumed in tandem with a client 206 such as a set top box and/or media streamer. In response, the interactivity application 215 can establish a session associated with the requested interactive application 227 on behalf of the user account and/or a client 206 that is paired with the user account. Accordingly, the interactivity application 215 can execute an instance of interactive content 221 and provide video content 223 to the client 206 as well as complementary content 224 to the controller 207.

Interactive content 221 can comprise, for example, interactive movies, television programming, or other types of content in which the user can navigate through a storyline and/or virtual world where the video content 223 provided to the client 206 varies depending upon actions taken by the user in a user interface rendered by the controller 207. In some examples, the complementary content 224 rendered on the controller 207 can represent an alternate view, replay view and/or alternative camera angle associated with live and/or recorded programming. As another example, the complementary content 224 can represent content that supplements the video content 223 rendered by the client 206. For example, programming rendered by the client 206 may involve a storyline surrounding a criminal investigation. Accordingly, the complementary content 224 can comprise items that are evidence related to the criminal investigation as the objects are discovered and/or collected within the storyline as it is viewed by a user as it is streamed by the client 206. Because the interactivity application 215 is providing the video content 223 as well as complementary content 224, the interactivity application 215 can determine when to update the complementary content 224 in such a scenario.

Interactive content 221 can also comprise interactive games and/or educational content in which user inputs can be captured by the controller application 246 and provided to the interactivity application 215 as input data 225 by the controller 207 via the network 209. The interactivity application 215 can then update the video content 223 and/or complementary content 224 to reflect the user input. For example, an interactive game can comprise a trivia game, where users answer questions and accumulate points for correctly answered questions. The trivia game can also comprise a competitive endeavor where users are pitted against other users who might be disparately located and/or competing by acting on video data rendered by the same client device 206 (e.g., located within the vicinity of the same client device 206).

Interactive content 221 can also comprise, for example, high-twitch-action video game where a view of game action is presented in the form of video content 223 rendered by the client device 206 and an alternative view associated with the game action is presented in the form of complementary content 224 that is rendered by the controller 207. For example, the video content rendered by the client 206 and complementary content rendered by the controller 207 can represent differing angles of the game action. As another example, the controller 207 can render an alternative view of game action in combination with a controller user interface, such as in the example shown in FIG. 1. As another example, the controller 207 can render a controller user interface through which the user can interact with the interactive content 221, and these interactions can be captured by the controller application 246 and provided to the interactivity application 215 in the form of input data 225.

Therefore, in the above examples as well as in other examples of interactive experiences that can be facilitated by the interactivity application 215, the interactivity application 215 can stream video content 223 and/or complementary content 224 to a client 206 and generate one or more interactive events that cause the video content 223 and/or complementary content 224 to be updated. An interactive event can correspond to user input captured by the controller application 246 and transmitted to the interactivity application 215 via the network 209. An interactive event can also correspond to a timecode being reached within interactive content 221 that is being consumed by the client device 206 and controller 207. In other words, the interactivity application 215 can generate an interactive event in response to reaching a certain point within video content 223 and/or complementary content 224 that is being streamed via the network 209 to the client device 206 and/or controller 207, respectively.

An interactive event can also be triggered upon an occurrence in an interactive game, educational content, or other type of interactive content 221. For example, upon reaching a certain milestone within interactive content 221, the interactivity application 215 can generate an interactive event that causes the video content and/or complementary content to be updated.

Accordingly, in order to facilitate an interactive experience, the interactivity application 215 can also facilitate registration of a controller 207 with an interactive content 221 session. Registration of a controller 207 allows the interactivity application 215 to provide complementary content 224 associated with the video content 223 that is provided to a corresponding client 206. In one embodiment, the interactivity application 215 can request authentication of a user via a controller 207 as well as obtain a request for interactive content via a user interface generated by the controller application 246, which is in communication with the interactivity application 215. The user may select an appropriate client device 206 via the user interface that is paired with an account of the user to receive video content 223 associated with an interactive content 221 session. Upon receiving such a request from the controller application 246, the interactivity application 215 can initiate the session including interactive content 221 that involves appropriate video content 223 being transmitted to the selected client 206 as well as complementary content 224 being served to the controller 207.

In another embodiment, the interactivity application 215 can obtain a request for interactive content 221 from a client device 206, where the request includes a user and/or device identifier with which the interactivity application 215 can determine whether the user is authorized the requested interactive content 221. In response, the interactivity application 215 can establish an interactive content 221 session and stream video content 223 associated with the requested interactive content 221 to the client device 206. Additionally, the user may join the interactive content 221 session with a controller 207, such as with a tablet device and/or smartphone. In response, the interactivity application 215 can stream complementary content to the controller application 246 executed on the controller 207.

A user may join an interactive content 221 session with a controller 207 in various ways. In one embodiment, the interactivity application 215 can include within the video content 223 rendered by the client 206 a session identifier that a user can enter in the controller application 246. The controller application 246 can provide the session identifier entered by the user to the interactivity application 215, which can validate the session identifier to identify which interactive content 221 session with which to join the controller 207. Accordingly, such a session identifier can be unique among the various interactive content 221 sessions being executed by the interactivity application 215. In some embodiments, such a session identifier can comprise a barcode, such as a quick response code (QR code) that is embedded within video content 223 rendered by the client device 206. In this scenario, the user may scan the QR code using a barcode scanner and/or camera integrated within the controller 207. The session identifier can also be obtained by the controller 207 from the client device 206 via a local area network connection between the client device 206 and controller 207.

Figure 3A:
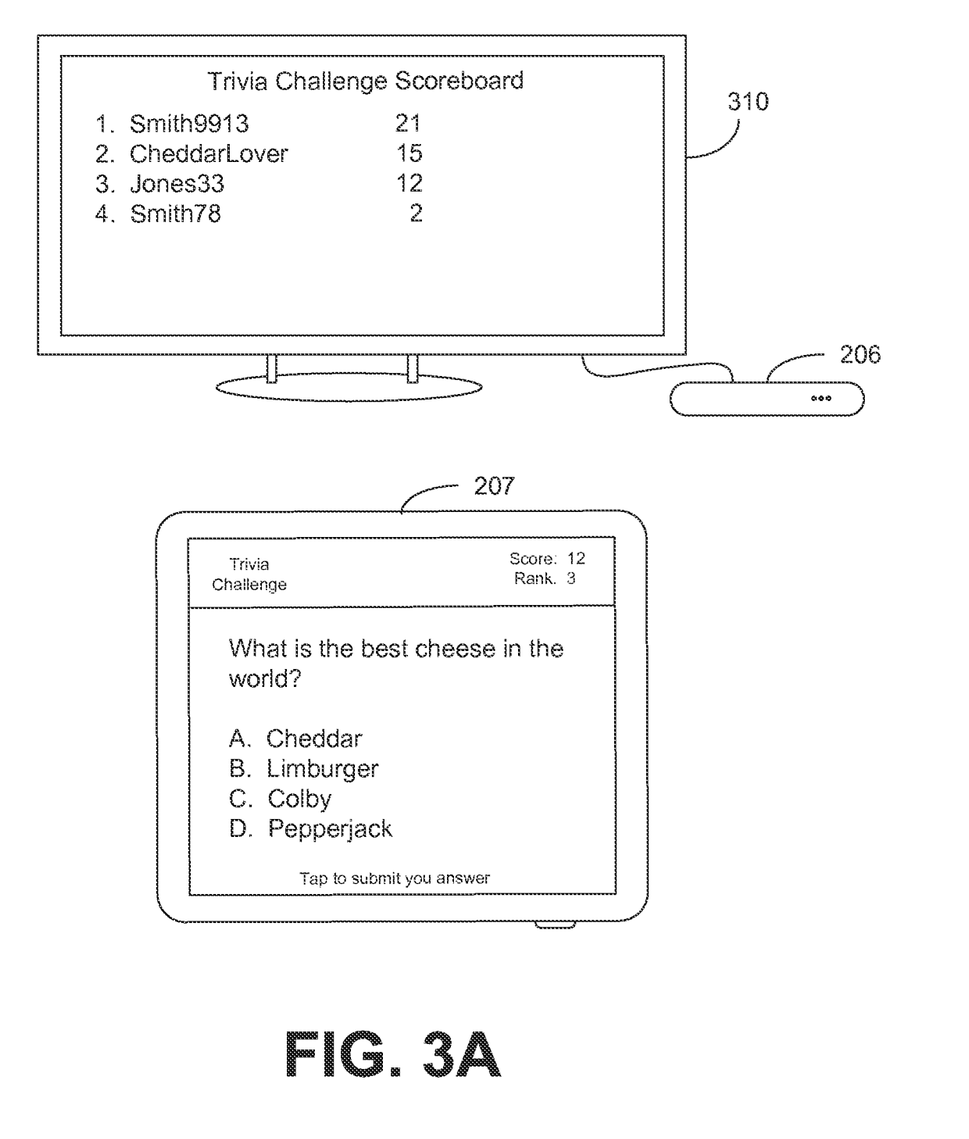
FIGS. 3A-3B is a drawing of an alternative example of a client device and controller facilitating an interactive experience according to various embodiments of the disclosure.
Figure 3B:
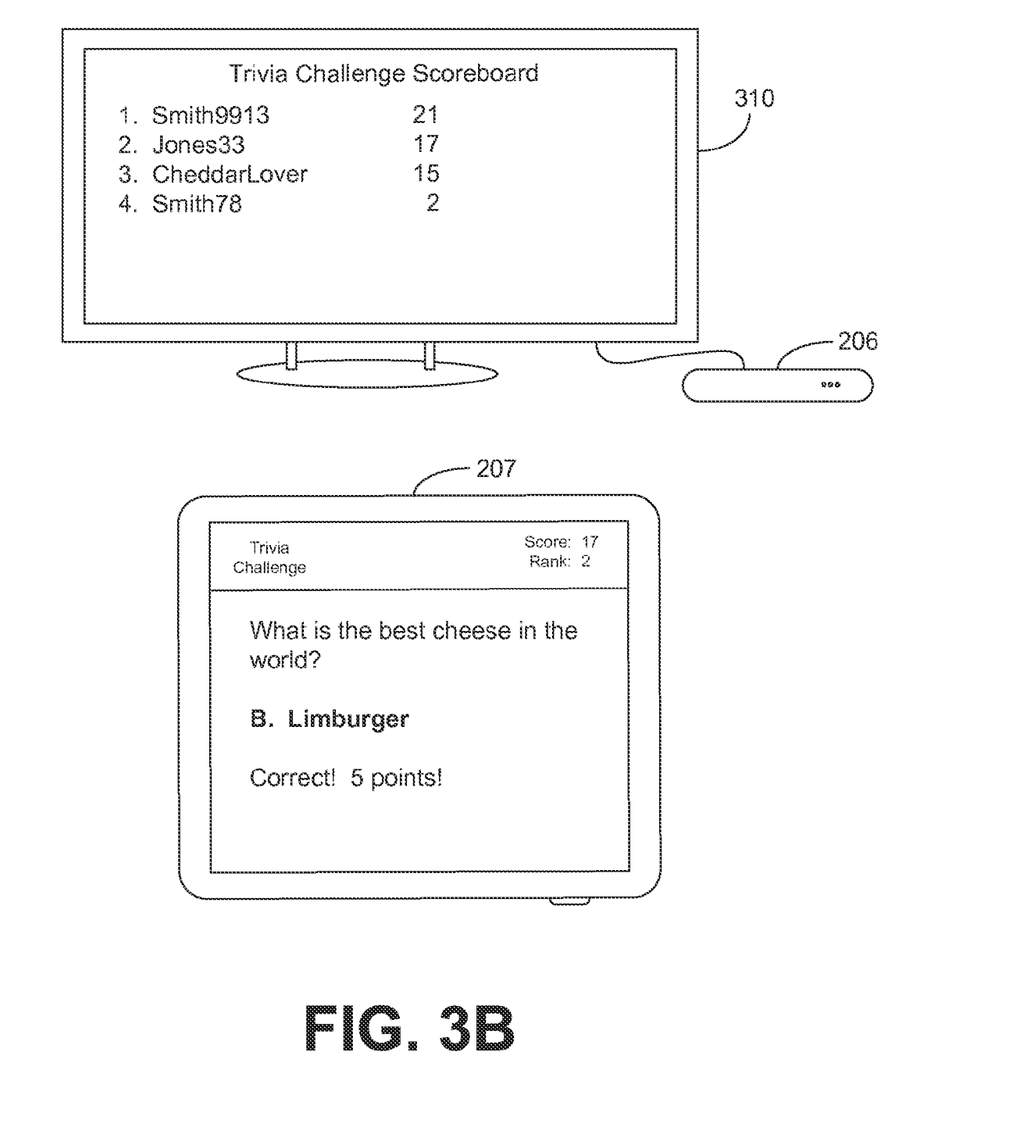

Reference is now made to FIGS. 3A-3B, which illustrate an example of an interactive experience facilitated by the interactivity application 215 according to various embodiments of the disclosure. In the depicted example, the client device 206 comprises a set-top box or a media streamer that is coupled to a display device 310. The client device 206 is in communication with the interactivity application 215 via a network connection, such as the internet. The controller 207 is also independently in communication with the interactivity application 215 via a network connection. Accordingly, the interactivity application 215 can provide video content 223 that is rendered by the client device 206 on a display 310 as well as complementary content that is rendered by the controller 207. As shown in FIG. 3A, the video content 223 can be related to an interactive experience, such as an interactive game, educational content, or other types of content.

In the depicted example, the interactivity application 215 has transmitted video content 223 and complementary content 224 to the client device 206 and controller 207, respectively. The complementary content 224 includes content that is related to the video content 223. The complementary content 224, in the depicted example, also includes a user interface with which a user may interact to further the interactive experience. In the example of FIG. 3A, when the user selects an answer related to a question that can be presented as textual content on the controller 207 and/or rendered by the client 206, the response can be transmitted from the controller 207 to the interactivity application 215 via the network 209.

In response, the interactivity application 215 can generate an interactive event, which causes the interactivity application 215 to generate an update to the video content 223 streamed to the client 206 and/or the complementary content 224 streamed to the controller 207. Referring to FIG. 3B, shown is an example of how the interactivity application 215 can update the video content 223 and/or complementary content 224 in response to input data 225 obtained from the controller 207. In the example of FIG. 3B, the user has provided user input via the controller application 246 executed by the controller 207, which generates and communicates input data 225 corresponding to the user's selection to the interactivity application 215 via the network 209.

The input data 225 corresponding to the particular interactive content 221 session causes an interactive event, which in turn causes the interactivity application 215 to update the video content 223 and/or complementary content 224 to reflect the user's input and/or selection. As shown in the example of FIG. 3B, such an update can take the form of advancing to a different level and/or stage in an interactive game. In other examples described above, such an update can take the form of advancing a storyline in an interactive storytelling experience and generating a corresponding update to the video content 223 and/or complementary content 224.

Figure 4:
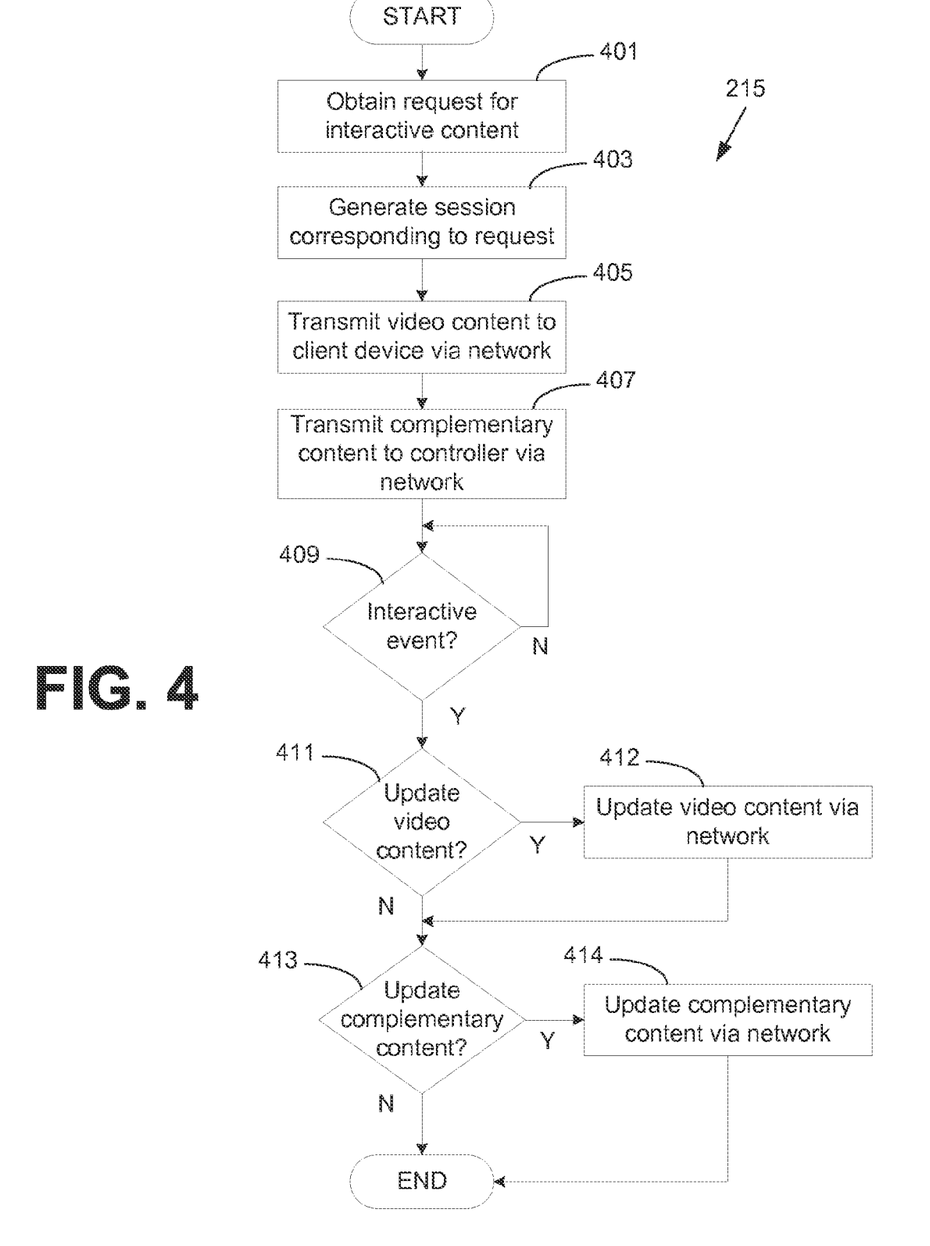
FIGS. 4-5 are flowcharts illustrating examples of functionality implemented as portions of the interactivity application executed in a computing environment in the networked environment of FIG. 2 according to various embodiments of the present disclosure.

Moving on to FIG. 4, shown is a flowchart that provides one example of the operation of a portion of the interactivity application 215 according to various embodiments. It is understood that the flowchart of FIG. 4 provides merely an example of the many different types of functional arrangements that may be employed to implement the operation of the portion of the interactivity application 215 as described herein. As an alternative, the flowchart of FIG. 4 may be viewed as depicting an example of steps of a method implemented in the computing environment 203 (FIG. 2) according to one or more embodiments.

First, in box 401, the interactivity application 215 can obtain a request for interactive content 221 on behalf of a client 206, controller 207 and/or a user. Such a request can take the form of a request to execute an interactive application 227 that includes streaming video content 223 and/or complementary content 224 from the interactivity application 215. The interactivity application 215 can also establish a session corresponding to the request in box 403. The session can identify a user account associated with the session, the requested interactive content 221, as well as an identifier corresponding to a client device 206 and/or controller 207 associated with the session.

In box 405, the interactivity application 215 can then transmit video content 223 corresponding to the requested interactive content 221 to the client device 206 associated with the session. In box 407, the interactivity application 215 can also transmit complementary content 224 corresponding to the requested interactive content 221 to the client device 206 associated with the session. In the context of this disclosure, video content 223 and/or complementary content 224 can be streamed to the client device 206 and/or controller 207, respectively. Alternatively, video content 223 and/or complementary content 224 can also be downloaded to the client device 206 and/or controller 207 and saved in a mass storage device that is accessible to either device.

In box 409, the interactivity application 215 can determine whether an interactive event related to the interactive content 221 associated with the session should be generated. As noted above, an interactive event can comprise user input from the controller 207, reaching a certain portion in a video stream, or any other event or occurrence. In response to the interactive event, the interactivity application 215 can then determine in box 411 whether the video content 223 rendered by the client 206 should be updated or changed in any way. If so, then in box 412, the interactivity application 215 updates the video content 223 correspondingly. In response to the interactive event, the interactivity application 215 can also determine in box 413 whether the complementary content 224 rendered by the controller 207 should be updated or changed in any way. If so, then in box 414, the interactivity application 215 updates the complementary content 224 correspondingly.

Figure 5:
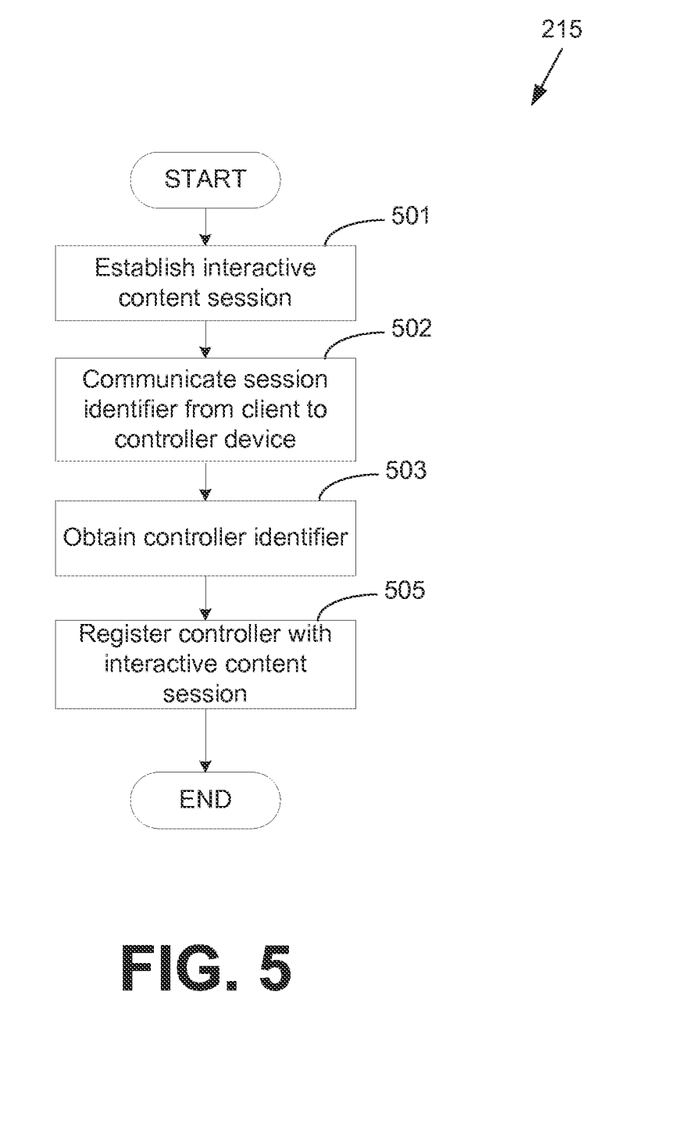

Moving on to FIG. 5, shown is a flowchart that provides one example of the operation of a portion of the interactivity application 215 according to various embodiments. It is understood that the flowchart of FIG. 5 provides merely an example of the many different types of functional arrangements that may be employed to implement the operation of the portion of the interactivity application 215 that facilitates registering of a controller device with an interactive content 221 session. As an alternative, the flowchart of FIG. 5 may be viewed as depicting an example of steps of a method implemented in the computing environment 203 (FIG. 2) according to one or more embodiments.

First, in box 501, the interactivity application 215 establishes an interactive content 221 session associated with content requested on behalf of a client 206. The session can also be associated with a session identifier that uniquely identifies the session with respect to other interactive content 221 sessions executed by the interactivity application 215. In box 502, the interactivity application 215 can communicate the session identifier 502 to one or more controllers 207.

In some embodiments, the session identifier can comprise a barcode, such as a quick response code (QR code) that is embedded within video content 223 rendered by the client device 206. In this scenario, the user may scan the QR code using a barcode scanner and/or camera integrated within the controller 207. The session identifier can also be obtained by the controller 207 from the client device 206 via a local area network connection between the client device 206 and controller 207. In other embodiments, the session identifier can be manually inputted into an application executed by the controller 207.

The controller 207 can transmit the session identifier along with an identifier that identifies the controller 207 to the interactivity application 215. Accordingly, in box 503, the interactivity application 215 can obtain the controller identifier corresponding to the controller 207 as well as potentially the session identifier corresponding to the interactive content 221 session. In box 505, the interactivity application 215 can register the controller 207 with the interactive content 221 session.

Figure 6:
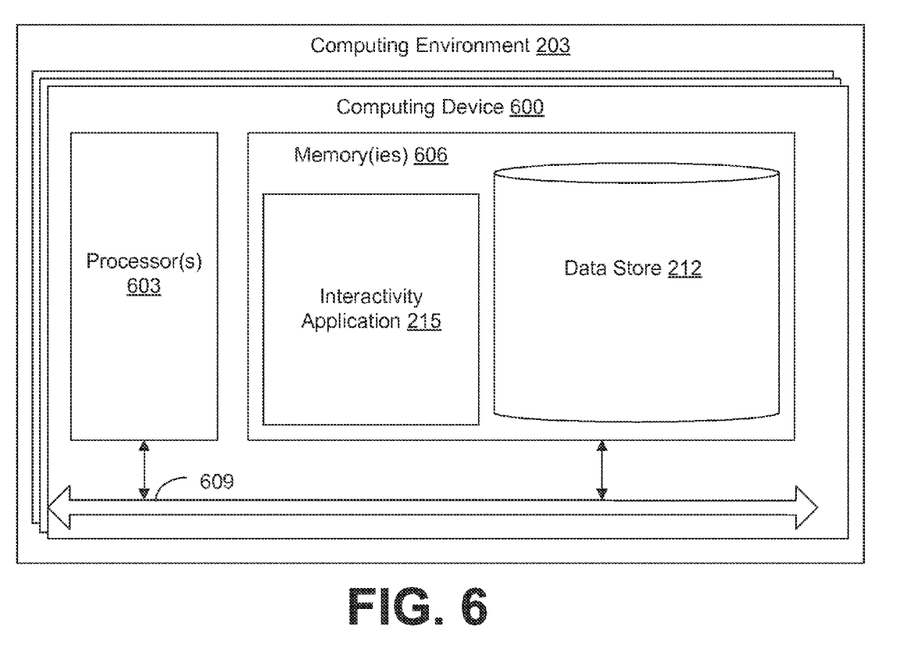
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more appropriate computing device 500. The appropriate computing device 500 includes at least one processor circuit, for example, having a processor 603 and a memory 606, both of which are coupled to a local interface 609. To this end, the appropriate computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 is the interactivity application 215 and potentially other applications. Also stored in the memory 606 may be a data store 212 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the interactivity application 215, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIG. 4-5 show the functionality and operation of an implementation of portions of the interactivity application 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIG. 4-5 show a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIGS. 4-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the interactivity application 215, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, having thus described the invention, at least the following is claimed:

1. A non-transitory computer-readable medium embodying a program executable in at least one computing device, the program, when executed, configured to cause the at least one computing device to at least:
   obtain a request to access an interactive application on behalf of a user account;
   identify video content associated with the interactive application;
   embed a session identifier in a barcode displayed as a part of the video content;
   stream the video content to a client device associated with the user account, the client device in communication with the at least one computing device via a network;
   obtain the session identifier from a controller device in communication with the at least one computing device via the network;
   identify complementary content associated with the interactive application;
   stream the complementary content to the controller device;
   obtain a user input from the controller device;
   determine whether at least one of the video content or the complementary content should be updated in response to the user input; and
   update the at least one of the video content or the complementary content in response to the user input.

2. The non-transitory computer-readable medium of claim 1, wherein the complementary content comprises a controller user interface, the controller user interface facilitating obtaining the user input via an input device associated with the controller device.

3. The non-transitory computer-readable medium of claim 2, the program further causing the at least one computing device to at least:
obtain an input from the controller user interface in the controller device via the network;
generate an update of the video content in response to the input; and
initiate transmission of the update of the video content to the client device via the network.

4. The non-transitory computer-readable medium of claim 3, the program further causing the at least one computing device to at least:
generate an update of the complementary content in response to the input; and
initiate transmission of the update of the complementary content to the controller device via the network.

5. A system, comprising:
at least one computing device; and
an application executable in the at least one computing device, the application configured to cause the at least one computing device to at least:
obtain a request for interactive content from a client device via a network;
transmit video content corresponding to the interactive content via the network to the client device, the video content containing a session identifier corresponding to a controller device, the session identifier embedded in a barcode placed in the video content;
obtain the session identifier from the controller device via the network;
transmit complementary content corresponding to the interactive content to the controller device in communication with the at least one computing device via the network;
generate an interactive event corresponding to the interactive content; and
transmit an update of at least one of the video content or the complementary content in response to the interactive event.

6. The system of claim 5, wherein the client device is configured to render the video content on a display device via a display interface.

7. The system of claim 5, wherein the controller device is configured to render the complementary content on a controller display.

8. The system of claim 5, wherein the application further causes the at least one computing device to at least:
establish a session associated with the request;
obtain a controller identifier associated with the controller device from the controller device via the network; and
register the controller device with the session based at least in part upon the controller identifier.

9. The system of claim 5, wherein the interactive event further comprises a question and the at least one computing device transmits an update of at least one of the video content or the complementary content in response to the interactive event by inserting a representation of the question into the video content.

10. The system of claim 5, wherein the application further causes the at least one computing device to at least:
obtain an input from the controller device via the network; and
update at least one of the video content or the complementary content in response to the input.

11. The system of claim 10, wherein the video content comprises textual content and the input from the controller device comprises a selection related to the textual content.

12. The system of claim 10, wherein the video content comprises an interactive game and the input from the controller device comprises navigation input related to the interactive game.

13. The system of claim 10, wherein the video content comprises interactive programming, the input from the controller device comprises a selection related to the interactive programming, and the at least one of the video content or the complementary content is updated in response to the input by selecting a video stream corresponding to the selection.

14. The system of claim 13, wherein the video stream comprises an alternative camera angle associated with the video content, the video stream being transmitted to the controller device via the network.

15. A method, comprising:
obtaining, in at least one computing device, a request to execute an interactive application on behalf of a user;
identifying, in the at least one computing device, a client device associated with the user, the client device in communication with the at least one computing device via a network;
transmitting, from the at least one computing device, video content corresponding to the interactive application via the network to the client device, the video content containing a session identifier corresponding to a controller device, the session identifier embedded in a barcode placed in the video content;
obtaining, in the at least one computing device, the session identifier from the controller device via the network;
identifying, in the at least one computing device, the controller device associated with the user in response to receiving the session identifier, the controller device in communication with the at least one computing device via the network;
transmitting, from the at least one computing device, complementary content corresponding to the interactive application to the controller device;
identifying, in the at least one computing device, an interactive event corresponding to the interactive application; and
transmitting, from the at least one computing device, an update of at least one of the video content or the complementary content in response to the interactive event.

16. The method of claim 15, wherein the complementary content further comprises a controller user interface, the controller user interface configured to facilitate obtaining user input via an input device of the controller device.

17. The method of claim 15, further comprising:
generating, in the at least one computing device, a session associated with the request;
obtaining, in the at least one computing device, a controller identifier associated with the controller device from the controller device via the network; and
registering, in the at least one computing device, the controller identifier with the session.

18. The method of claim 15, wherein the client device is coupled to a display device.

19. The method of claim 15, wherein the controller device comprises at least one of a tablet computing device or a smartphone device.

20. The method of claim 15, wherein the interactive event further comprises a question and transmitting an update of at least one of the video content or the complementary content in response to the interactive event further comprises updating the video content with the question.

21. The method of claim 16, wherein the application further comprises:
   obtaining, from the controller user interface, an input from the controller device via the network; and
   updating, in the at least one computing device, at least one of the video content or the complementary content in response to the input.

22. The method of claim 16, wherein the video content comprises textual content and the input from the controller user interface comprises a selection related to the textual content.

23. The method of claim 16, wherein the video content comprises an interactive game and the input from the controller user interface comprises navigation input related to the interactive game.

24. A method, comprising:
   obtaining, in a controller device, a session identifier embedded in a barcode displayed by a display of a client device;
   generating, in the controller device, a request to execute interactive content, the request incorporating the session identifier;
   transmitting, from the controller device, the request to at least one computing device, via a network;
   obtaining, via the controller device, complementary content associated with the interactive content from the at least one computing device via the network, the complementary content further being associated with an interactive content session corresponding to the client device in communication with the at least one computing device via the network;
   transmitting, via the controller device, user input to the at least one computing device, the user input being associated with the interactive content; and
   obtaining, in the controller device, an update of the complementary content via the network from the at least one computing device.

25. The method of claim 24, further comprising registering, via the controller device, the controller device with the interactive content session.

26. The method of claim 24, wherein the controller device further comprises one of a smartphone device or a tablet computing device.

* * * * *